3,171,818
METHOD OF PRODUCING PHOSPHORUS-CONTAINING POLYMERS FROM DIPHOSPHONOUS ACID ESTERS AND ORGANIC DIHALOGEN COMPOUNDS
Manfred Sander, Frankfurt am Main, Germany, assignor to Armstrong Cork Company, Lancaster, Pa., a corporation of Pennsylvania
No Drawing. Filed Sept. 6, 1961, Ser. No. 136,164
3 Claims. (Cl. 260—2)

Various proposals have already been made for producing phosphorus-containing polymers by the polymerization of unsaturated organic phosphorus compounds. The phosphorus in such polymers is contained in side groups while the main chain is a hydrocarbon chain. The present invention, on the other hand, is directed at the production of polymers which contain phosphorus in the main chain, the phosphorus being connected with the hydrocarbon radicals of the main chain only by P—C bonds.

The polymers in accordance with the invention can be prepared by reaction of disphosphonous acid esters with organic dihalogen compounds in accordance with the mechanism $n(R'O)_2P\text{—}R\text{—}P(OR')_2 + n\text{Hal—}R''\text{—Hal} \longrightarrow$

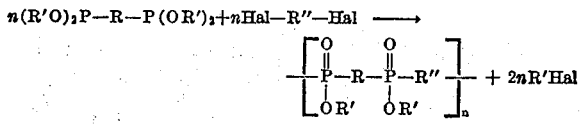

R and R'' are bivalent organic radicals, R' is a monovalent organic radical.

Diphosphonous acid esters which are suitable for this purpose are compounds of the type $$(R'O)_2P\text{—}R\text{—}P(OR')_2$$

in which in each case at least one R' group on each phosphorus atom is an alkyl group. The bivalent radical R can be an aliphatic, aromatic or araliphatic hydrocarbon radical. Examples of such suitable compounds are tetraethyl-tetramethylene-diphosphonite, tetraethyl pentamethylene disphosphonite, tetraethyl-hexamethylene-diphosphonite, P,P'-diethyl-P,P'-diphenyl-hexamethylene-diphosphonite, tetraethyl-ethylene-diphosphonite, tetraethyl-p-phenylene-diphosphonite, and tetrabutyl-hexamethylene-diphosphonite. These compounds can be prepared for instance by reaction of the corresponding organic dimagnesium halides with dialkyl-halophosphites.

As dihalo-compounds, there can be used halogen compounds, the halogen atoms of which are bound to aliphatic hydrocarbon radicals, preferably those the halogen atoms of which are bound to primary carbon atoms. Examples hereof are 1,4-dichlorobutane, 1,6-dichlorohexane, 1,2-dibromomethane, 1,4-dibromobutane, β,β'-dichlorodiethyl ether, β,β'-dichlorodiethyl sulfone and p-xylylene dichloride.

If it is desired to obtain linear products, the diphosphonous acid ester is mixed with the dihalogen compound in a molar ratio of 1:1 and heated with the exclusion of oxygen until the splitting off of alkyl halide commences. In certain cases, the reaction starts up very vigorously. In this connection, it is advisable to carry out the reaction in an inert solvent, for instance toluene, xylene, dibutyl ether, or nitrobenzene, in which connection the heat of reaction can be better removed. The reaction in general starts at about 100° to 140° C. In order to complete it, one heats toward the end of the reaction to about 150° to 180° C., possibly distilling the solvent off. The products can however also be separated from the solvent by precipitation with a non-solvent such as benzene hydrocarbons or by freezing out.

The products prepared in this manner are viscous oils, soft masses, or resins of low melting point, depen on the constitution of the components used. Their cl ical structure corresponds to the formula:

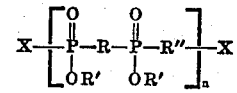

in which the terminal groups X are halogen atoms anc phosphor-organic groups.

The substances therefore are esters of polyphosph acids. They can be converted into the free polyphosph acids by boiling with acids or alkalis. No splitting of main chain occurs upon this hydrolysis since this cl only has P—C bonds aside from C—C bonds. The : stances are very stable to thermal degradation. S decomposition occurs only above 250° C. Dependin the phosphorus content of the polymers, they are d cultly combustible to non-combustible. They are rea solvent in solvents such as alcohols, chlorinated hy( carbons, ethers, esters and ketones.

A limitation of the chain length of the products car obtained by using one of the components in excess, o than the molar ratio of 1:1. In this way, the re can be obtained that the products possess predomina either halogen terminal groups or phosphor-organic minal groups.

The linear-polymer products can be cross-linked view of the existing phosphine ester groups to form soluble elastomers. This cross-linkage can be effec for instance by heating with metal oxides, diamines, phenols, dihalogen hydrocarbons or similar difunctio compounds. Cross-linking can be effected at hig temperatures, however, even without addition of cr( linking agents, if the non-cross-linked products still c tain sufficient halogen terminal groups. In these ca: the terminal halogen groups react with the middle ph phonate groups in accordance with the equation

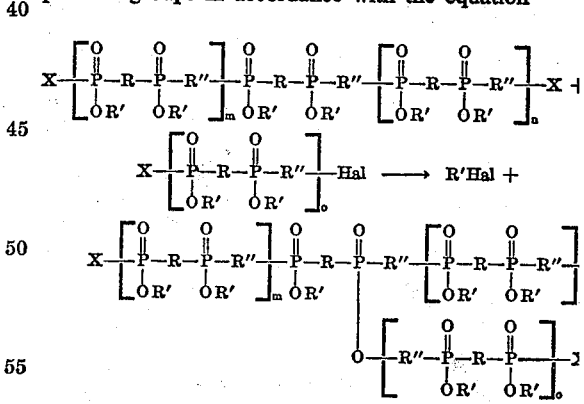

The temperature at which this type of cross-linkage occi depends on the reactivity of the halogen terminal grot present.

If the halogen atom of the terminal group is located a long aliphatic chain (greater than $C_2$), the cross-linki reaction occurs only at temperatures above 220° C. a proceeds very slowly. If the halogen atom is in alpl position to a benzene ring (benzyl position), the cro linking can occur already at 160° to 190° C. Wh carbonyl halide terminal groups are concerned, the cro linkage takes place already at room temperature or up slight heating, so that when using dicarbonyl chloric for the polycondensation, no linear polymers can be c tained. Furthermore, the velocity of the cross-linki reaction depends on the nature of the halogen and i creases in the sequence Cl<Br<I. The degree of the cross-linking is finally dependent on the number of halogen terminal groups present. By the selection of suitable starting components, it is possible to produce products which can be cross-linked easily or only with difficulty upon further heating. A stabilizing of the linear polycondensates to thermal cross-linkage can be effected in analogous manner by complete exclusion of halogen terminal groups. This can be done either by a polycondensation which is as complete as possible, or by subsequent reaction of halogen-containing polycondensates with compounds which react with the halogen, for instance phosphorous acid esters.

The cross-linked products are elastic masses or solid resins which become elastic in the hot. They are insoluble in all solvents and do not become liquid upon heating. By boiling with acids or alkalis, the cross-linked products can be converted again into linear polyphosphinic acids which are identical to the hydrolysis products of non-cross-linked products.

The linear polycodensates, depending on their condition of aggregation, can be used as hydraulic oils, lubricants, or lubricant additives, as well as flame-inhibiting impregnating agents. The cross-linked products can be used for the production of elastic plastics. The hydrolysis products of the polycondensates can be used as ion-exchangers, as complex formers (chelating or sequestering agents) and as thickening agents.

Example 1

97.8 grams of tetraethyl hexamethylene diphosphonite are heated at the boiling point for 4 hours with 52.5 grams of p-xylylene dichloride in 100 ml. xylene. The upper end of the reflux condenser was connected with a trap cooled to —70° C. in which 36.2 grams of ethyl chloride (94.4% of the theoretical quantity) had collected at the end of the reaction. The xylene was distilled off in vacuum at a bath temperature of 110° to 120° C. The resultant product was viscous in the hot, and solidified at room temperature to form a soft, solid, somewhat tacky colorless mass, which was soluble in the hot in most organic solvents. The substance contained 16.15% phosphorus and 0.6% chlorine. The reduced viscosity (measured in 1:1 benzene/tetrachloroethane at 25° C.) was 0.22.

Heating the substance for three hours at 180° to 200° C. led to a product which is elasto-viscous in the hot, and horn in the cold, and proved to be insoluble in all solvents. Products having the same properties were obtained from the non-cross-linked polymeric substance by heating for one hour with 1% magnesium oxide at 160° to 170° C., or by heating for two hours with 1.5% hexamethylene diamine at 170° to 180° C.

In another batch, the product obtained after the xylene had been distilled off was further heated for 5 hours at 160° to 170° C. As a result of this treatment, the reduced viscosity increased from 0.21 to 0.39, and the chlorine content dropped from 0.5% to 0.1%. This product could be cross-linked only at temperatures above 200° C.

In a third batch, the product obtained after the xylene had been distilled off was heated with 10% of its weight triethyl phosphite to 140° C. for one hour. The product remaining after the excess tetraethyl phosphite had been distilled off, which product was similar in its other properties to the substances which had not been after-treated, proved to be resistant to heating up to 250° C., i.e., no cross-linking occurred thereby. The product could be cross-linked by heating with 1 to 2% magnesium oxide, hexamethylene diamine or p-xylylene dichloride.

Example 2

55.2 grams of tetraethyl hexamethylene diphosphonite are heated with 25.4 grams of 1,4-dichlorobutane without solvent for 5 hours at 150° to 165° C. and then for 2 hours at 180° to 190° C., 23.6 grams of ethyl chloride (86% of the theoretical yield) being collected in a cooled trap. The resultant product was a highly viscous colorless oil which dissolved in most organic solvents. It contained 19.2% phosphorus, and 0.9% chlorine. In benzene/tetrachloroethane, the substance showed a reduced viscosity of 0.12.

A sample thereof was heated for 3 hours at 250° C., and then proved to be no longer soluble in benzene and diethylether. The substance was however still soluble in tetrahydrofuran, dioxane, and tetrachloroethane. The chlorine content dropped thereby to 0.5%. This shows that a slight cross-linking had already taken place.

Example 3

20 grams of tetraethyl hexamethylene diphosphonite were heated with 11.5 grams of ethylene bromide for 4 hours under reflux (130° to 145° C.), 40% of the theoretical amount of ethyl bromide splitting off. Thereupon the reaction mixture was heated for 1½ hours at 160° to 170° C. at 15 mm. mercury, only minimum amounts of ethylene bromide distilling off. The product obtained in this manner was a colorless, viscous oil which dissolved in all customary solvents. It contained 0.4% bromine and 19.9% phosphorus. If a sample of this substance is held in the flame of a gas burner, it decomposes with inflation and burns only shortly before complete carbonization with a weak flame which immediately goes out upon removal from the flame of the burner.

If in this example the ethylester is replaced by 16.5 grams of the methyl ester of hexamethylene diphosphonous acid, there is obtained a similar product (P-content, 22.5%) which is even more difficult to burn than the above product.

Example 4

15.4 grams of tetraethyl hexamethylene diphosphonite were heated for 10 hours at 140° to 160° C. with 6.76 grams of $\beta,\beta'$-dichlorodiethyl ether, 65% of the theoretical amount of ethyl chloride being split off. The resultant product contained 6.5% chlorine. The substance was heated for an additional 2 hours at 180° C., whereby the chlorine content dropped to 0.9%. The product obtained in this manner is a highly viscous, colorless oil which is soluble in most organic solvents.

Example 5

15.6 grams of tetraethyl pentamethylene diphosphonite were heated for 4 hours under reflux, with 3.75 grams of p-xylylene dichloride in 25 ml. of xylene, 92% of the theoretical amount of ethyl chloride being distilled off. From the xylene solution, the product separated as a semi-solid mass upon the addition of 30 ml. of petroleum ether. The substance dried in vacuum at 130° C. contained 0.5% chlorine and in benzene/tetrachloroethane, had a reduced viscosity of 0.25. In its behavior upon heating with or without cross-linking agents, the substance behaves in the same way as the product described in Example 1, i.e., it could be cross-linked relatively easily.

A similar product is obtained if instead of the pentamethylene diphosphonite, there are used 14.9 grams of tetraethyl tetramethylene diphosphonite.

Example 6

9.7 grams of P,P'-diethyl-p,p'-diphenyl-hexamethylenediphosphonite and 4.03 grams of p-xylylene dichloride were heated for 12 hours in boiling xylene, 2.5 grams of ethyl chloride being obtained as distillate. The product obtained upon the splitting off of the xylene was a viscous, colorless mass which is soluble in benzene or acetone. Despite the fact that it contains 0.9% Cl, no cross-linking occurred upon heating for 5 hours at 200° to 220° C., since the phosphinite groups are blocked by the phenyl radical.

I claim:
1. The method of producing phosphorus-containing polycondensates comprising reacting diphosphonites of the general formula

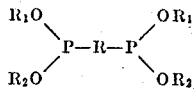

with dihalogen compounds of the general formula

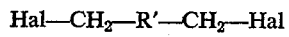

in a molar ratio of 1:0.9 to 1:1.1 by heating to 100° to 200° C., and distilling off the resultant alkyl halide produced thereby, wherein R and R' are selected from the group consisting of bivalent aliphatic hydrocarbon radicals and bivalent aromatic hydrocarbon radicals, $R_1$ is an alkyl group containing 1–4 carbon atoms, and $R_2$ is selected from the group consisting of alkyl groups containing 1–4 carbon atoms and phenyl groups.

2. The method according to claim 1 wherein the tion is carried out in an inert solvent.

3. The method according to claim 1 wherein the polycondensates originally obtained in which $R_1$ and $R_2$ alkyl groups are converted into a cross-linked, insoluble condition by heating them to a temperature in the range of 150°–250° C. and which is higher than said reaction temperature.

References Cited in the file of this patent
UNITED STATES PATENTS

| 2,728,806 | Morris et al. | Dec. 27, |
| 2,957,931 | Hamilton et al. | Oct. 25, |